(12) United States Patent
Zheng et al.

(10) Patent No.: US 11,381,976 B2
(45) Date of Patent: Jul. 5, 2022

(54) METHOD OF PAIRING WIRELESS EARPIECES AND SYSTEM THEREFOR

(71) Applicant: Kunshan Telink Semiconductor Co., Ltd., Kunshan (CN)

(72) Inventors: Mingjian Zheng, Shanghai (CN); Haipeng Jin, Shanghai (CN)

(73) Assignee: Kunshan Telink Semiconductor Co., Ltd., Kunshan (CN)

( * ) Notice: Subject to any disclaimer, the term of this patent is extended or adjusted under 35 U.S.C. 154(b) by 0 days.

(21) Appl. No.: 17/100,137

(22) Filed: Nov. 20, 2020

(65) Prior Publication Data

US 2021/0160697 A1 May 27, 2021

(30) Foreign Application Priority Data

Nov. 21, 2019 (CN) .......................... 201911145786.5

(51) Int. Cl.
*H04W 76/15* (2018.01)
*H04W 4/80* (2018.01)
(Continued)

(52) U.S. Cl.
CPC ........... *H04W 12/55* (2021.01); *H04W 12/71* (2021.01); *H04W 76/11* (2018.02); *H04W 76/15* (2018.02); *H04W 76/38* (2018.02)

(58) Field of Classification Search
CPC ..... H04W 12/55; H04W 12/71; H04W 76/11; H04W 76/15; H04W 76/38; H04W 8/24;
(Continued)

(56) References Cited

U.S. PATENT DOCUMENTS 11,265,358 B1 * 3/2022 Dellalyan ............... H04L 65/80
2013/0316649 A1 * 11/2013 Newham ............... H04W 12/50
455/41.2

(Continued)

FOREIGN PATENT DOCUMENTS

CN 107708014 A 2/2018
CN 107809696 A 3/2018
(Continued)

OTHER PUBLICATIONS

European Search Report dated May 31, 2021 in European Application No. 20208820.9, 11 pages.
(Continued)

*Primary Examiner* — Andrew Wendell
(74) *Attorney, Agent, or Firm* — Nixon & Vanderhye P.C.

(57) ABSTRACT

Disclosed is a pairing method and a pairing system for a wireless headset, the pairing method comprising: establishing, by an intermediate device, wireless communication connections respectively with a first wireless earpiece and a second wireless earpiece, and sending pairing information respectively to the first wireless earpiece and the second wireless earpiece based on the established wireless communication connections; and establishing, by the first wireless earpiece and the second wireless earpiece, a wireless communication link between the first wireless earpiece and the second wireless earpiece based on the pairing information. By the above pairing method, pairing between the first wireless earpiece and the second wireless earpiece can be realized conveniently.

18 Claims, 3 Drawing Sheets

(51) Int. Cl.
*H04W 12/55* (2021.01)
*H04W 76/38* (2018.01)
*H04W 76/11* (2018.01)
*H04W 12/71* (2021.01)

(58) Field of Classification Search
CPC ....... H04W 84/18; H04W 4/80; H04W 12/50; H04W 4/06; H04W 76/14; H04W 36/0011; H04R 1/1016; H04R 2420/07
See application file for complete search history.

(56) References Cited

U.S. PATENT DOCUMENTS

| | | | |
|---|---|---|---|
| 2016/0338119 A1* | 11/2016 | Bodas | H04W 76/14 |
| 2017/0195771 A1* | 7/2017 | Hung | H04R 1/10 |
| 2019/0098006 A1* | 3/2019 | Kim | H04W 12/06 |
| 2019/0289383 A1 | 9/2019 | Chawan et al. | |
| 2020/0107127 A1* | 4/2020 | Gong | H04R 5/033 |
| 2020/0329400 A1* | 10/2020 | Goyal | H04L 1/1809 |
| 2022/0066734 A1* | 3/2022 | So | G06F 3/165 |
| 2022/0070955 A1* | 3/2022 | Hareuveni | H04W 80/02 |

FOREIGN PATENT DOCUMENTS

| | | |
|---|---|---|
| CN | 108174457 A | 6/2018 |
| CN | 108540889 A | 9/2018 |
| CN | 108810741 A | 11/2018 |
| CN | 108811182 A | 11/2018 |
| CN | 108901006 A | 11/2018 |
| CN | 109600694 A | 4/2019 |

OTHER PUBLICATIONS

Chinese Office Action dated May 14, 2021 in Chinese Application No. 201911145786.5, with English translation, 18 pages.
Chinese Office Action dated Dec. 10, 2021 in Chinese Application No. 201911145786.5, with English translation, 10 pages.

* cited by examiner

METHOD OF PAIRING WIRELESS EARPIECES AND SYSTEM THEREFOR

CROSS-REFERENCE TO RELATED PATENT APPLICATION

This application claims the benefit of and priority to Chinese Patent Application No. 201911145786.5 filed on Nov. 21, 2019, the entire disclosure of which is incorporated by reference herein.

TECHNICAL FIELD

The present disclosure relates to the field of wireless headsets, and in particular, to a pairing method and a pairing system for a wireless headset.

BACKGROUND

This section intends to provide a background or context for the embodiments of the disclosure stated in the claims, and the description here should not be construed as the prior art simply because it is included in this section.

In recent years, due to the advantage of ease of wearing, wireless headsets have been deeply favored by consumers, and wireless headset technologies have been developed rapidly. However, the technology of pairing the left and right earpieces of a wireless headset still suffers from a problem of cumbersome pairing, which causes great inconvenience to both the consumers and the wireless headset manufactures.

SUMMARY

In view of the above problem of the related art that it is cumbersome to realize the pairing of the left and right earpieces for a wireless headset, the present disclosure proposes a pairing method and a pairing system for a wireless headset, which can solve the above problem.

The following solutions are provided in the embodiments of the disclosure.

In a first aspect, there provides a pairing method for a wireless headset, the wireless headset including a first wireless earpiece and a second wireless earpiece, where the pairing method includes: establishing, by an intermediate device, wireless communication connections respectively with the first wireless earpiece and the second wireless earpiece, and sending pairing information respectively to the first wireless earpiece and the second wireless earpiece based on the established wireless communication connections; and establishing, by the first wireless earpiece and the second wireless earpiece, a wireless communication link between the first wireless earpiece and the second wireless earpiece based on the pairing information.

In some embodiments, the pairing information includes a designated MAC address, an RF channel and an RF access code that are dynamically-assigned, where the RF channel and the RF access code are required for communication between the first wireless earpiece and the second wireless earpiece.

In some embodiments, the pairing method further includes: broadcasting respectively when a preset trigger condition is met, by the first wireless earpiece and the second wireless earpiece, a first pairing request and a second pairing request each carrying respective identification information; scanning, by the intermediate device, the first pairing request and the second pairing request; and establishing, by the intermediate device, wireless communication connections respectively with the first wireless earpiece and the second wireless earpiece in turn according to the respective identification information carried in the scanned first pairing request and the scanned second pairing request.

In some embodiments, the sending, by the intermediate device, the pairing information respectively to the first wireless earpiece and the second wireless earpiece based on the established wireless communication connections includes: receiving, by the intermediate device, the first pairing request broadcasted by the first wireless earpiece, and sending, by the intermediate device, a first pairing response carrying the pairing information to the first wireless earpiece; and/or receiving, by the intermediate device, the second pairing request broadcasted by the second wireless earpiece, and sending, by the intermediate device, a second pairing response carrying the pairing information to the second wireless earpiece.

In some embodiments, the preset trigger condition is that the intermediate device is in electrical contact with the first wireless earpiece and/or the second wireless earpiece.

In some embodiments, the broadcasting respectively when a preset trigger condition is met, by the first wireless earpiece and the second wireless earpiece, a first pairing request and a second pairing request each carrying respective identification information includes: broadcasting and/or stopping broadcasting, by the first wireless earpiece, the first pairing request periodically and/or in response to a preset trigger event; and/or broadcasting and/or stopping broadcasting, by the second wireless earpiece, the second pairing request periodically and/or in response to a preset trigger event.

In some embodiments, the respective identification information includes respective device addresses, respective device types and respective serial numbers of device-sent information.

In some embodiments, the establishing, by the first wireless earpiece and the second wireless earpiece, a wireless communication link between the first wireless earpiece and the second wireless earpiece based on the pairing information includes establishing, by the first wireless earpiece and the second wireless earpiece, the wireless communication link between the first wireless earpiece and the second wireless earpiece based on the dynamically-assigned RF channel and the dynamically-assigned RF access code.

In some embodiments, the pairing method further includes performing, by another device, wireless data transmission synchronously with the first wireless earpiece and the second wireless earpiece based on the dynamically-assigned designated MAC address.

In some embodiments, the intermediate device is a charging case for accommodating the first wireless earpiece and the second wireless earpiece.

In a second aspect, there provides a pairing system for a wireless headset, including an intermediate device, a first wireless earpiece and a second wireless earpiece, where the intermediate device is configured to establish wireless communication connections respectively with the first wireless earpiece and the second wireless earpiece and send pairing information respectively to the first wireless earpiece and the second wireless earpiece based on the established wireless communication connections; the first wireless earpiece and the second wireless earpiece are configured to establish a wireless communication link between the first wireless earpiece and the second wireless earpiece based on the pairing information.

In some embodiments, the pairing information includes a designated MAC address, an RF channel and an RF access code that are dynamically-assigned.

In some embodiments, the first wireless earpiece and the second wireless earpiece are configured to broadcast respectively, when a preset trigger condition is met, a first pairing request and a second pairing request each carrying respective identification information; the intermediate device is configured to scan the first pairing request and the second pairing request and establish wireless communication connections respectively with the first wireless earpiece and the second wireless earpiece in turn according to the respective identification information carried in the scanned first pairing request and the scanned pairing request.

In some embodiments, the intermediate device is configured to: receive the first pairing request broadcasted by the first wireless earpiece and send a first pairing response carrying the pairing information to the first wireless earpiece; and/or receive the second pairing request broadcasted by the second wireless earpiece and send a second pairing response carrying the pairing information to the second wireless earpiece.

In some embodiments, the preset trigger condition is that the intermediate device is in electrical contact with the first wireless earpiece and/or the second wireless earpiece.

In some embodiments, the first wireless earpiece is configured to broadcast and/or stop broadcasting the first pairing request periodically and/or in response to a preset trigger event; and/or the second wireless earpiece is configured to broadcast and/or stop broadcasting the second pairing request periodically and/or in response to a preset trigger event.

In some embodiments, the respective identification information includes respective device addresses, respective device types and respective serial numbers of device-sent information.

In some embodiments, the first wireless earpiece and the second wireless earpiece are configured to establish the wireless communication link between the first wireless earpiece and the second wireless earpiece based on the dynamically-assigned RF channel and the dynamically-assigned RF access code.

In some embodiments, the pairing system further includes another device configured to perform wireless data transmission synchronously with the first wireless earpiece and the second wireless earpiece based on the dynamically-assigned designated MAC address.

In some embodiments, the intermediate device is a charging case for accommodating the first wireless earpiece and the second wireless earpiece.

At least one of the above technical solutions adopted by the embodiments in the present disclosure can achieve such beneficial effects that the pairing information is respectively sent via wireless communication to the first wireless earpiece and the second wireless earpiece by the intermediate device so that the wireless headset can realize the pairing of the left and right earpieces more conveniently based on the received pairing information.

It should be noted that the above illustration is merely a summary of the technical solutions of the present disclosure for better understanding of the technical means of the present disclosure, so that one skilled in the art could implement the technical solutions in accordance with the present disclosure. In order to make the above and other objects, features and advantages of the disclosure more apparent, the detailed description of the present disclosure will be illustrated by examples.

BRIEF DESCRIPTION OF THE DRAWINGS

By referring to the detailed description of some preferred embodiments below, various other advantages and benefits will be apparent to one of ordinary skills in the art. The drawings are only provided for showing preferred embodiments of the present disclosure, rather than limiting the scope thereof. Moreover, the same or similar or corresponding reference signs or numerals are used to represent the same or similar or corresponding elements throughout the drawings. In the drawings.

DETAILED DESCRIPTION

Exemplary embodiments of the present disclosure will be described in more detail below with reference to the drawings. Although exemplary embodiments of this disclosure are shown in the drawings, it should be understood that this disclosure may be implemented in various forms, rather than being limited to the embodiments illustrated herein. On the contrary, these embodiments are provided for more thoroughly understanding the present disclosure and fully conveying the scope of the present disclosure to one skilled in the art.

It should be understood that, in the present disclosure, terms such as "include" or "have", etc., are intended to indicate the existence of a feature, a digit, a step, a behavior, a component, an element disclosed in the present disclosure or a combination thereof, without excluding the possibility of the existence of one or more other features, digits, steps, behaviors, components, elements or combinations thereof.

It also should be noted that, in the case of no conflicts, the embodiments of the present disclosure and the features illustrated in the embodiments may be combined with each other. The present disclosure will be illustrated in detail below with reference to the drawings and the embodiments.

Figure 1:
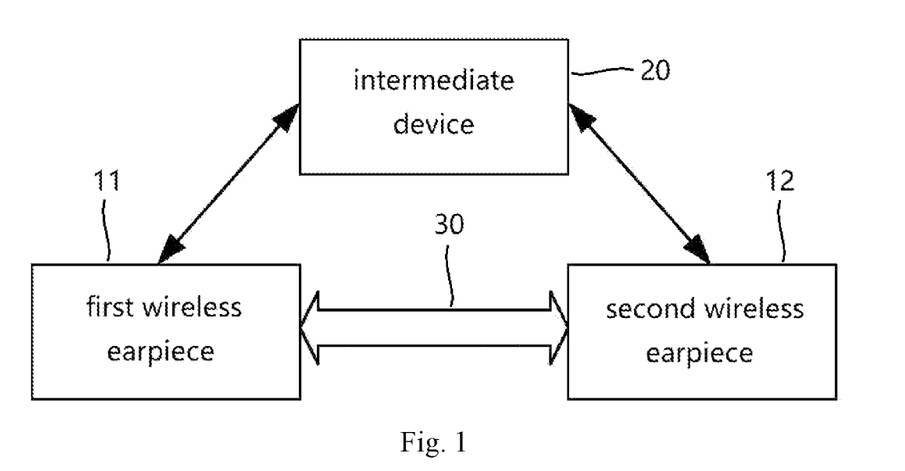
FIG. 1 is a schematic structural diagram of a pairing system for a wireless headset according to an embodiment of the disclosure.

FIG. 1 is a schematic structural diagram of a pairing system for a wireless headset according to an embodiment of the present disclosure. The pairing system includes a first wireless earpiece 11, a second wireless earpiece 12 and an intermediate device 20. The purpose of the embodiment of the present disclosure is to pair the first wireless earpiece 11 and the second wireless earpiece 12 so as to form a wireless earpiece group.

In an illustrative application scenario, the first wireless earpiece 11 and the second wireless earpiece 12 may be a group of wireless earpieces for which pairing of the left and right earpieces has not been performed and/or needs to be performed again. The intermediate device 20 may be a wireless charging case for accommodating the first wireless earpiece 11 and the second wireless earpiece 12. Optionally, the intermediate device 20 may also be a tool (fixture) that realizes pairing of the left and right earpieces for the first wireless earpiece 11 and the second wireless earpiece 12 at the factory. It should be noted that, only one or more application scenarios are shown by examples, without limiting the application scenarios. In actual application, the application scenarios may be set according to actual needs, which is not limited in the embodiments of the present disclosure.

Figure 2:
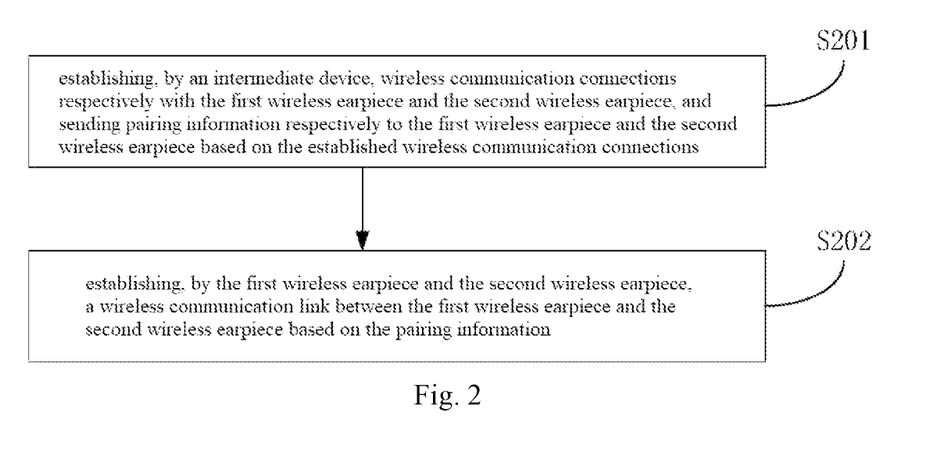
FIG. 2 is a schematic flow chart of a pairing method for a wireless headset according to an embodiment of the disclosure.

FIG. 2 is a schematic flow chart of a pairing method for a wireless headset according to an embodiment of the present disclosure.

As shown in FIG. 2, the pairing method may include a step of S201 in which an intermediate device respectively establishes wireless communication connections respectively with a first wireless earpiece and a second wireless earpiece, and sends pairing information respectively to the first wireless earpiece and the second wireless earpiece based on the established wireless communication connections.

Herein, the intermediate device, the first wireless earpiece and the second wireless earpiece are all wireless transceiver devices, for example, Bluetooth devices.

In some embodiments, the pairing information may include a designated MAC address, an RF channel and an RF access code that are obtained via dynamic assignment performed by the intermediate device, where the RF channel and the RF access code are required for communication between the first wireless earpiece and the second wireless earpiece. On this basis, after receiving the assigned RF channel and RF access code, the first wireless earpiece and the second wireless earpiece may establish the wireless communication link between the first wireless earpiece and the second wireless earpiece according to the assigned RF channel and RF access code; and after receiving the assigned designated MAC address, the first wireless earpiece and the second wireless earpiece may use the assigned designated MAC address as the address identification of a wireless earpiece group, which is formed by pairing the first wireless earpiece and the second wireless earpiece.

Figure 3:
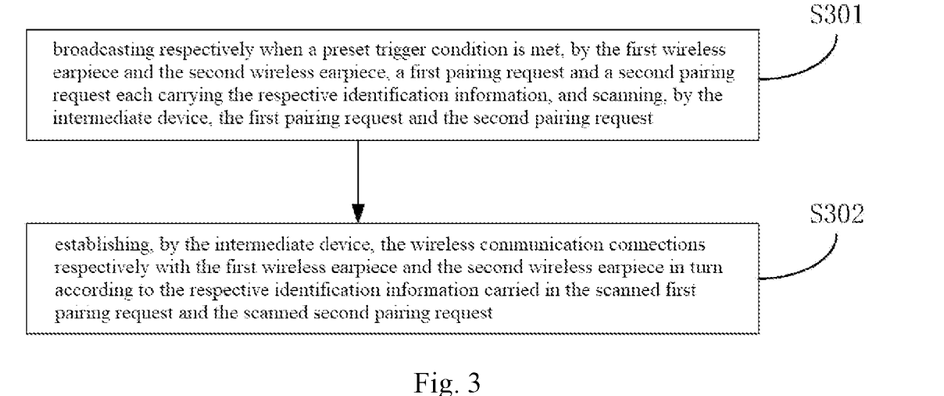
FIG. 3 is a schematic flow chart of a pairing method for a wireless headset according to another embodiment of the disclosure.

In some embodiments, as shown in FIG. 3, the above S201 may further include the following steps.

S301: When a preset trigger condition is met, the first wireless earpiece and the second wireless earpiece broadcast respectively a first pairing request and a second pairing request each carrying the respective identification information, and the intermediate device scans the first pairing request and the second pairing request.

S302: The intermediate device establishes wireless communication connections respectively with the first wireless earpiece and the second wireless earpiece in turn according to the respective identification information carried in the scanned first pairing request and the scanned second pairing request.

Herein, the preset trigger condition may include a state in which the intermediate device is in electrical contact with the first wireless earpiece and/or the second wireless earpiece respectively. For example, the first wireless earpiece and/or the second wireless earpiece may be accommodated in the intermediate device to be in electrical contact with the intermediate device via the contacts distributed on the first wireless earpiece and/or the second wireless earpiece and the intermediate device, thereby meeting the preset trigger condition. Optionally, when a charging voltage or a charging current is detected, by the first wireless earpiece and/or the second wireless earpiece, to be applied thereto, the first wireless earpiece and/or the second wireless earpiece start(s) to broadcast the first pairing request and/or the second pairing request carrying respective identification information; or when the charging voltage or the charging current is detected, by the intermediate device, to be generated by itself, a scanning operation will be initiated. Optionally, the preset trigger condition may also be met by triggering a designated button provided on the intermediate device, the first wireless earpiece or the second wireless earpiece.

In S301, optionally, the first wireless earpiece and/or the second wireless earpiece may periodically broadcast the first pairing request and/or the second pairing request carrying the respective identification information. For example, when the above preset trigger condition is met, the first wireless earpiece and/or the second wireless earpiece may broadcast the first pairing request and/or the second pairing request every other second, until response signal is received by the first wireless earpiece and/or the second wireless earpiece. Or, the first wireless earpiece and/or the second wireless earpiece may broadcast the first pairing request and/or the second pairing request carrying the respective identification information in response to a preset trigger event. For example, when the above preset trigger condition is met, the intermediate device performs an electrical trigger operation on the first wireless earpiece and/or the second wireless earpiece based on a button operation of a user, and at the same time, initiates a scanning operation based on the button operation. Or, the first wireless earpiece and/or the second wireless earpiece may stop broadcasting the first pairing request and/or the second pairing request carrying the respective identification information in response to another preset trigger event. For example, when the intermediate device starts to communicates with the first wireless earpiece, the intermediate device may perform another electrical trigger operation on the second wireless earpiece so as to make the second wireless earpiece stop broadcasting, and when the intermediate device stops communicating with the first wireless earpiece, the intermediate device may perform still another electrical trigger operation on the second wireless earpiece so as to make the second wireless earpiece restart broadcasting.

In some embodiments, the respective identification information carried in the first pairing request and the second pairing request includes respective device addresses, respective device types and respective serial numbers of device-sent information (i.e., Sequence Number commonly used during communication). For example, the device address may be the device MAC address of the wireless earpiece, the device type may be configured to indicate that the wireless earpiece is a left earpiece or a right earpiece, and the serial number of device-sent information may be the unique identification of each data packet. Optionally, the first pairing request and/or the second pairing request may further include battery information and pairing state information, etc., which is not specifically limited in the embodiments of the present disclosure.

In S302, optionally, the precedence order for sequentially establishing wireless communication connections may be determined according to a preset order or a scanning order. For example, it may be preset that the intermediate device first performs information interaction with the first wireless earpiece and then performs information interaction with the second wireless earpiece. In another example, the intermediate device may perform information interaction with the wireless earpiece corresponding to the pairing request (the first pairing requestor the second pairing request) having been scanned first.

In some embodiments, in S201, sending, by the intermediate device, the pairing information respectively to the first wireless earpiece and the second wireless earpiece based on the established wireless communication connections includes: receiving, by the intermediate device, the first pairing request broadcasted by the first wireless earpiece, and sending, by the intermediate device, a first pairing response carrying the pairing information to the first wireless earpiece; and/or receiving, by the intermediate device, the second pairing request broadcasted by the second wireless earpiece, and sending, by the intermediate device, a second pairing response carrying the pairing information to the second wireless earpiece.

Figure 4:
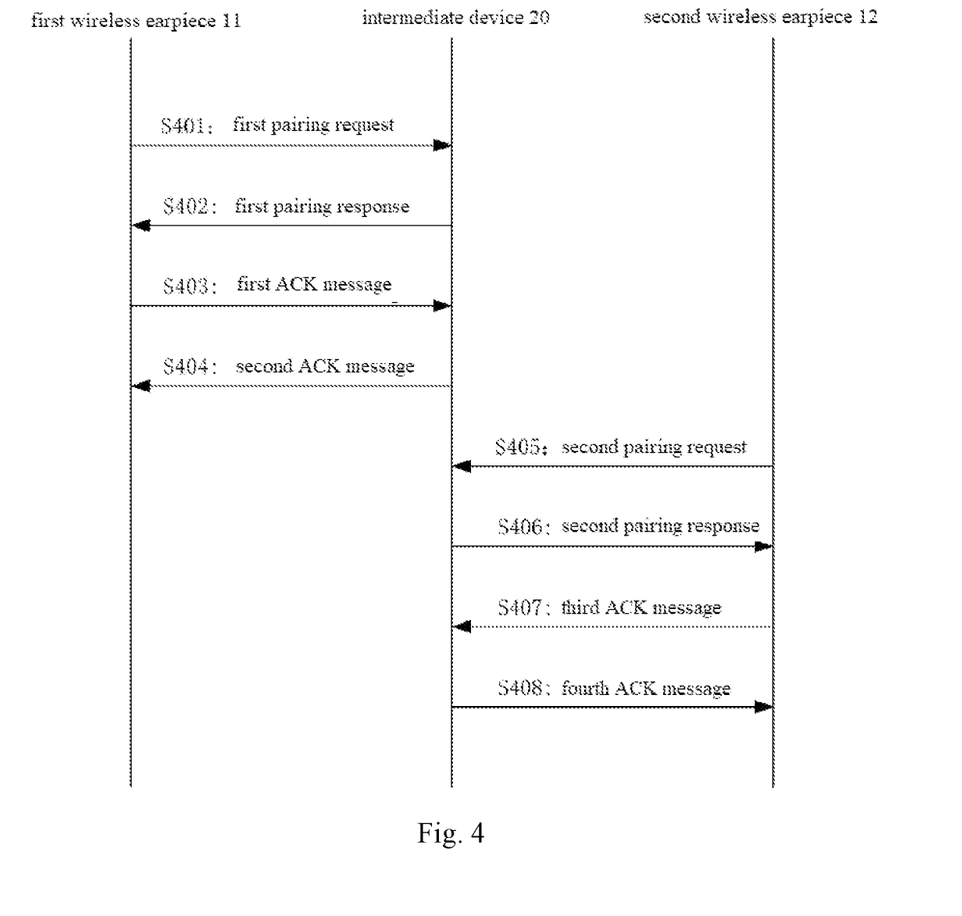
FIG. 4 is a schematic flow chart of a pairing method for a wireless headset according to yet another embodiment of the disclosure.

For example, as shown in FIG. 4, the above S201 may further include the following steps.

S401: The intermediate device receives the first pairing request broadcasted by the first wireless earpiece, and the intermediate device receives the first the pairing request by scanning. The first the pairing request may include a device MAC address for indicating the first wireless earpiece, a device type (for example, it may be configured to indicate that the first wireless earpiece is the left earpiece) and a serial number of device-sent information, as well as the battery information of the first wireless earpiece, etc.

S402: The intermediate device sends the first pairing response to the first wireless earpiece, where the first pairing response carries the pairing information, a device type for indicating the intermediate device (for example, it may be configured to indicate that the intermediate device is a charging case) and a serial number of device-sent information, as well as battery information of the intermediate device, etc.

S403: The intermediate device receives a first acknowledgement (ACK) message transmitted by the first wireless earpiece, where the first ACK message may include the identification information of the first wireless earpiece and the pairing information.

S404: The intermediate device sends a second ACK message to the first wireless earpiece, where the second ACK message may include the identification information of the intermediate device and the pairing information.

S405: The intermediate device receives the second pairing request broadcasted by the second wireless earpiece, where in the next time-slot after the intermediate device sends the ACK message to the first wireless earpiece, the intermediate device triggers the second wireless earpiece to perform broadcasting. Accordingly, the second wireless earpiece broadcasts the second pairing request, and the intermediate device receives the second pairing request by scanning. The second pairing request may include a device MAC address for indicating the second wireless earpiece, a device type (for example, it may be configured to indicate that the second wireless earpiece is the right earpiece) and a serial number of device-sent information, as well as battery information of the second wireless earpiece.

S406: The intermediate device sends the second pairing response to the second wireless earpiece, where the second pairing response also carries pairing information, a device type for indicating the intermediate device (for example, it may be configured to indicate that the intermediate device is a charging case) and a serial number of device-sent information, as well as battery information of the intermediate device, etc.

S407: The intermediate device receives a third ACK message transmitted by the second wireless earpiece, where the third ACK message may include the identification information of the second wireless earpiece and the pairing information.

S408: The intermediate device sends a fourth ACK message to the second wireless earpiece, where the fourth ACK message may include identification information of the intermediate device and the pairing information.

It should be understood that, in the above S401-S408, first of all, the intermediate device may establish a first wireless communication connection with the first wireless earpiece and send the pairing information to the first wireless earpiece, and then the intermediate device may establish a second wireless communication connection with the second wireless earpiece and send the pairing information. It should be understood that the above order is not specifically limited in the embodiments of the present disclosure.

As shown in FIG. 2, the pairing method 200 further includes a step of S202 in which the first wireless earpiece and the second wireless earpiece establish a wireless communication link between the first wireless earpiece and the second wireless earpiece based on the pairing information.

In some embodiments, after the S201, the first wireless earpiece and the second wireless earpiece both obtain the pairing information, where the pairing information may include the RF channel and the RF access code that are required for communication between the first wireless earpiece and the second wireless earpiece, which are dynamically assigned by the intermediate device. Based on this, the S202 may include establishing, by the first wireless earpiece and the second wireless earpiece, the wireless communication link between the first wireless earpiece and the second wireless earpiece based on the RF channel and the RF access code.

In some embodiments, after the S201, the first wireless earpiece and the second wireless earpiece both obtain the pairing information, where the pairing information may further include the designated MAC address dynamically assigned by the intermediate device. On this basis, the S202 may further include performing, by another device, wireless data transmission synchronously with the first wireless earpiece and the second wireless earpiece based on the dynamically-assigned designated MAC address. Herein, said another device may be a device that provides data to the first wireless earpiece 11 and the second wireless earpiece 12 in the wireless earpiece group, the device may be, for example, a mobile phone with a wireless communication function, and the data may be, for example, multi-media data (for example, audio data, etc.). Said another device may pair with the first wireless earpiece and the second wireless earpiece in the wireless earpiece group according to the dynamically-assigned designated MAC address, and may send data synchronously to the first wireless earpiece and the second wireless earpiece, so that the first wireless earpiece and the second wireless earpiece in the device group may synchronously receive the same data.

Based on the same technical concept, an embodiment of the disclosure further provides a pairing system for a wireless headset, which is configured to perform the pairing method for a wireless headset according to any one of the above embodiments. FIG. 1 is a schematic structural diagram of a pairing system for a wireless headset according to an embodiment of the present disclosure.

As shown in FIG. 1, the pairing system includes a first wireless earpiece 11, a second wireless earpiece 12, and an intermediate device 20.

Herein, the intermediate device 20 is configured to establish wireless communication connections respectively with the first wireless earpiece 11 and the second wireless earpiece 12 and send pairing information respectively to the first wireless earpiece 11 and the second wireless earpiece 12 based on the established wireless communication connections; and the first wireless earpiece 11 and the second wireless earpiece 12 are configured to establish a wireless communication link 30 between the first wireless earpiece 11 and the second wireless earpiece 12 based on the pairing information.

In some embodiments, the pairing information includes a designated MAC address, an RF channel and an RF access code that are dynamically-assigned, where the RF channel and the RF access code are required for communication between the first wireless earpiece and the second wireless earpiece.

In some embodiments, when a preset trigger condition is met, the first wireless earpiece 11 and the second wireless earpiece 12 are configured to broadcast respectively a first pairing request and a second pairing request each carrying the respective identification information, and the intermediate device 20 is configured to scan the first pairing request and the second pairing request, and establish wireless communication connections respectively with the first wireless earpiece 11 and the second wireless earpiece 12 in turn according to the respective identification information carried in the scanned first pairing request and the scanned second pairing request.

In some embodiments, the intermediate device 20 is configured to: receive the first pairing request broadcasted by the first wireless earpiece 11 and send a first pairing response carrying the pairing information to the first wireless earpiece 11; and/or receive the second pairing request broadcasted by the second wireless earpiece 12 and send a second pairing response carrying the pairing information to the second wireless earpiece 12.

In some embodiments, the preset trigger condition is that the intermediate device 20 is in electrical contact with the first wireless earpiece 11 and/or the second wireless earpiece 12.

In some embodiments, the first wireless earpiece 11 is configured to broadcast and/or stop broadcasting the first pairing request periodically and/or in response to a preset trigger event; and/or the second wireless earpiece 12 is configured to broadcast and/or stop broadcasting the second pairing request periodically and/or in response to a preset trigger event.

In some embodiments, the respective identification information carried in the pairing requests includes respective device addresses, respective device types and respective serial numbers of device-sent information.

In some embodiments, the first wireless earpiece 11 and the second wireless earpiece 12 are configured to establish the wireless communication link 30 between the first wireless earpiece 11 and the second wireless earpiece 12 based on the dynamically-assigned RF channel and RF access code.

In some embodiments, the pairing system further includes another device configured to perform wireless data transmission synchronously to the first wireless earpiece 11 and the second wireless earpiece 12 based on the dynamically-assigned designated MAC address.

In some embodiments, the first wireless earpiece 11 and the second wireless earpiece 12 are a group of wireless earpiece devices, and the intermediate device 20 is a charging case for accommodating the first wireless earpiece 11 and the second wireless earpiece 12.

Although the concepts and principles of the present disclosure have been described with reference to several specific embodiments, it should be understood that the present disclosure is not limited to the specific embodiments disclosed, and the partition of each aspect does not indicate that the features in such aspects cannot be combined for further benefits; instead, such a partition is merely provided for easy illustration. The present disclosure is intended to cover various modifications and equivalent arrangements included in the concepts and scope of the claims.

What is claimed is:

1. A pairing method for a wireless headset, the wireless headset comprising a first wireless earpiece and a second wireless earpiece, wherein the pairing method comprises:
    establishing, by an intermediate device, wireless communication connections respectively with the first wireless earpiece and the second wireless earpiece, and sending pairing information respectively to the first wireless earpiece and the second wireless earpiece based on the established wireless communication connections; and
    establishing, by the first wireless earpiece and the second wireless earpiece, a wireless communication link between the first wireless earpiece and the second wireless earpiece based on the pairing information,
    wherein the pairing information comprises a designated MAC address, an RF channel and an RF access code that are dynamically-assigned, the RF channel and the RF access code being required for communication between the first wireless earpiece and the second wireless earpiece.

2. The pairing method of claim 1, wherein the establishing, by an intermediate device, wireless communication connections respectively with the first wireless earpiece and the second wireless earpiece comprises:
    broadcasting respectively when a preset trigger condition is met, by the first wireless earpiece and the second wireless earpiece, a first pairing request and a second pairing request each carrying the respective identification information;
    scanning, by the intermediate device, the first pairing request and the second pairing request; and
    establishing, by the intermediate device, the wireless communication connections respectively with the first wireless earpiece and the second wireless earpiece in turn according to the respective identification information carried in the scanned first pairing request and the scanned second pairing request.

3. The pairing method of claim 2, wherein the sending, by the intermediate device, pairing information respectively to the first wireless earpiece and the second wireless earpiece based on the established wireless communication connections comprises:
    receiving, by the intermediate device, the first pairing request broadcasted by the first wireless earpiece; and sending, by the intermediate device, a first pairing response carrying the pairing information to the first wireless earpiece; and/or
    receiving, by the intermediate device, the second pairing request broadcasted by the second wireless earpiece; and sending, by the intermediate device, a second pairing response carrying the pairing information to the second wireless earpiece.

4. The pairing method of claim 2, wherein the preset trigger condition is that the intermediate device is in electrical contact with the first wireless earpiece and/or the second wireless earpiece.

5. The pairing method of claim 2, wherein the broadcasting respectively when a preset trigger condition is met, by the first wireless earpiece and the second wireless earpiece, a first pairing request and a second pairing request each carrying the respective identification information comprises:
    broadcasting and/or stopping broadcasting, by the first wireless earpiece, the first pairing request periodically and/or in response to a preset trigger event; and/or broadcasting and/or stopping broadcasting, by the second wireless earpiece, the second pairing request periodically and/or in response to a preset trigger event.

6. The pairing method of claim 2, wherein the respective identification information comprises respective device addresses, respective device types, and respective serial numbers of device-sent information.

7. The pairing method of claim 1, wherein the establishing, by the first wireless earpiece and the second wireless earpiece, a wireless communication link between the first wireless earpiece and the second wireless earpiece based on the pairing information comprises:
establishing, by the first wireless earpiece and the second wireless earpiece, the wireless communication link between the first wireless earpiece and the second wireless earpiece based on the dynamically-assigned RF channel and the dynamically-assigned RF access code.

8. The pairing method of claim 1, further comprising performing, by another device, wireless data transmission synchronously with the first wireless earpiece and the second wireless earpiece based on the dynamically-assigned designated MAC address.

9. The pairing method according to claim 1, wherein the intermediate device is a charging case for accommodating the first wireless earpiece and the second wireless earpiece.

10. A pairing system for a wireless headset, comprising an intermediate device, a first wireless earpiece and a second wireless earpiece, wherein:
the intermediate device is configured to establish wireless communication connections respectively with the first wireless earpiece and the second wireless earpiece, and send pairing information respectively to the first wireless earpiece and the second wireless earpiece based on the established wireless communication connections; and
the first wireless earpiece and the second wireless earpiece are configured to establish a wireless communication link between the first wireless earpiece and the second wireless earpiece based on the pairing information,
wherein the pairing information comprises a designated MAC address, an RF channel and an RF access code that are dynamically-assigned, the RF channel and the RF access code being required for communication between the first wireless earpiece and the second wireless earpiece.

11. The pairing system of claim 10, wherein:
the first wireless earpiece and the second wireless earpiece are configured to broadcast respectively, when a preset trigger condition is met, a first pairing request and a second pairing request each carrying the respective identification information; and
the intermediate device is configured to scan the pairing request and establish wireless communication connections respectively with the first wireless earpiece and the second wireless earpiece in turn according to the respective identification information carried in the scanned first pairing request and the scanned second pairing request.

12. The pairing system of claim 11, wherein the intermediate device is configured to:
receive the first pairing request broadcasted by the first wireless earpiece; and send a first pairing response carrying the pairing information to the first wireless earpiece; and/or
receive the second pairing request broadcasted by the second wireless earpiece; and send a second pairing response carrying the pairing information to the second wireless earpiece.

13. The pairing system of claim 11, wherein the preset trigger condition is that the intermediate device is in electrical contact with the first wireless earpiece and/or the second wireless earpiece.

14. The pairing system of claim 11, wherein the first wireless earpiece is configured to broadcast and/or stop broadcasting the first pairing request periodically and/or in response to a preset trigger event; and/or the second wireless earpiece is configured to broadcast and/or stop broadcasting the second pairing request periodically and/or in response to a preset trigger event.

15. The pairing system of claim 11, wherein the respective identification information comprises respective device addresses, device types and respective serial numbers of device-sent information.

16. The pairing system of claim 10, wherein the first wireless earpiece and the second wireless earpiece are configured to establish the wireless communication link between the first wireless earpiece and the second wireless earpiece based on the dynamically-assigned RF channel and the dynamically-assigned RF access code.

17. The pairing system of claim 14, further comprising another device configured to perform wireless data transmission synchronously with the first wireless earpiece and the second wireless earpiece based on the dynamically-assigned designated MAC address.

18. The pairing system according to claim 10, wherein the intermediate device is a charging case for accommodating the first wireless earpiece and the second wireless earpiece.

* * * * *